(12) United States Patent
Cunningham

(10) Patent No.: US 12,603,550 B1
(45) Date of Patent: Apr. 14, 2026

(54) LAND VEHICLE WHEEL MOUNTED ELECTRICITY GENERATOR

(71) Applicant: David Cunningham, Fort Wayne, IN (US)

(72) Inventor: David Cunningham, Fort Wayne, IN (US)

( * ) Notice: Subject to any disclaimer, the term of this patent is extended or adjusted under 35 U.S.C. 154(b) by 0 days.

(21) Appl. No.: 19/041,608

(22) Filed: Jan. 30, 2025

(51) Int. Cl.
| | |
|---|---|
| *H02K 7/18* | (2006.01) |
| *B60B 19/00* | (2006.01) |
| *B60L 11/18* | (2006.01) |
| *B60R 16/03* | (2006.01) |
| *B60R 16/033* | (2006.01) |
| *H02J 7/14* | (2006.01) |

(52) U.S. Cl.
CPC ....... *H02K 7/1846* (2013.01); *B60R 16/0307* (2013.01); *B60R 16/033* (2013.01); *H02J 7/14* (2013.01); *B60B 19/006* (2013.01)

(58) Field of Classification Search
CPC ...... H02K 7/1846; H02K 49/10; H02K 7/003; H02K 47/14; B60L 50/608; B60L 11/18; B60K 25/08
USPC .............. 310/67 A, 67 R, 69, 266–268, 68 R
See application file for complete search history.

(56) References Cited

U.S. PATENT DOCUMENTS

| | | | |
|---|---|---|---|
| 5,960,901 A | 10/1999 | Hanagan | |
| 8,338,999 B2 * | 12/2012 | Takeuchi | ................. H02K 7/14 |
| | | | 310/67 R |

| | | | |
|---|---|---|---|
| 8,353,375 B2 | 1/2013 | James | |
| 11,299,059 B1 | 4/2022 | De La Rua et al. | |
| 2003/0184173 A1 * | 10/2003 | Hashimoto | .......... H02K 5/1735 |
| | | | 310/90 |
| 2003/0227230 A1 * | 12/2003 | Gizaw | ................... H02K 1/148 |
| | | | 310/216.053 |

FOREIGN PATENT DOCUMENTS

| | | | | |
|---|---|---|---|---|
| WO | WO-2008115351 A1 * | 9/2008 | ........... | B60K 17/043 |
| WO | 2010122341 A2 | 10/2010 | | |

* cited by examiner

*Primary Examiner* — Jose A Gonzalez Quinones
(74) *Attorney, Agent, or Firm* — George Pappas Barrett McNagny LLP

(57) ABSTRACT

A land vehicle wheel mounted electricity generator comprises a non-rotating axle secured to the land vehicle, a wheel rotatably mounted to the axle and rotatable about an axle longitudinal axis, inboard and outboard magnets secured to the wheel and rotatable therewith about the axle longitudinal axis, and one or more conductors secured to the non-rotating axle. The inboard and outboard magnets define a magnetic field space therebetween and the one or more conductors extend in the magnetic field space. As the inboard and outboard magnets rotate about the axle longitudinal axis and past the one or more conductors, electric current is induced in the one or more conductors. Preferably, the generator further comprises an inboard housing half mounted to the wheel and an outboard housing half mounted to the inboard housing half. The magnets are mounted to the housing halves and magnetic flux travels between magnets through the housing halves.

20 Claims, 8 Drawing Sheets

LAND VEHICLE WHEEL MOUNTED ELECTRICITY GENERATOR

BACKGROUND OF THE INVENTION

1. Field of the Invention

The present invention relates to electricity generators. More particularly, the present invention is directed to a generator which is adapted to be coupled to the wheel of a land vehicle, such as, for example, an internal combustion vehicle, an electric vehicle, or a tow-behind vehicle such as a trailer, and is configured to convert mechanical energy from the rotation of the wheel to electrical energy.

2. Background

Land vehicles, such as, for example, internal combustion vehicles, electric vehicles, and tow-behind vehicles such as trailers, commonly include a variety of electrical systems and components. For example, tow-behind vehicles such as trailers typically include brake and auxiliary light systems and may include other electrical systems such as heating and air conditioning systems, refrigeration systems, and sound or audio systems. These systems are typically powered by the vehicle's batteries or by other onboard power sources. However, a need exists for a supplemental power source such as a generator which can be coupled to the wheel of the vehicle and is configured to convert mechanical energy from the rotation of the wheel to electrical energy for powering the vehicle's electrical systems.

SUMMARY OF THE INVENTION

The present invention is directed to a land vehicle wheel mounted electricity generator comprising a non-rotating axle secured to the land vehicle, a wheel rotatably mounted to the axle and rotatable about an axle longitudinal axis, inboard and outboard magnets secured to the wheel and rotatable therewith about the axle longitudinal axis, and one or more conductors secured to the non-rotating axle. The inboard and outboard magnets define a magnetic field space therebetween and the one or more conductors extend in the magnetic field space. As the inboard and outboard magnets rotate about the axle longitudinal axis and past the one or more conductors, electric current is induced in the one or more conductors.

Preferably, the magnetic field space is annular shaped, and the one or more conductors extend at least in part perpendicular to the axle longitudinal axis in the magnetic field space. Preferably, the one or more conductors extend radially from or relative to the non-rotating axle.

Preferably, the one or more conductors are electrically connected between an annular outer perimeter ring and an inner hub. The inner hub is electrically connected to the non-rotating axle and an insulated conductor is electrically connected to the perimeter ring. The insulated conductor preferably extends through an internal passageway extending into the non-rotating axle.

Preferably, the generator further comprises an inboard housing half which is mounted to the wheel and an outboard housing half which is mounted to the inboard housing half. The inboard and outboard magnets are mounted to the inboard and outboard housing halves, and magnetic flux travels between the inboard and outboard magnets through the inboard and outboard housing halves.

Preferably, the inboard housing half includes a first perimeter flange and the outboard housing half includes a second perimeter flange, wherein the outboard housing half is secured to the inboard housing half by securing the second perimeter flange to the first perimeter flange. The first and second perimeter flanges are preferably secured together by a plurality of fasteners.

Preferably, a hub is rotatably mounted to the axle and the wheel and inboard housing half are secured to the hub by a plurality of lug bolts.

Preferably, the inboard and outboard magnets are ring or disc-shaped permanent magnets. The inboard and outboard magnets can also comprise a plurality of magnets.

Preferably, a battery is electrically connected to the one or more conductors and is charged by the electric current induced in the one or more conductors. A regulator is preferably electrically connected between the battery and the one or more conductors for regulating the electric current conducted therebetween

BRIEF DESCRIPTION OF THE DRAWINGS

The above-mentioned and other features of this invention and the manner of attaining them will become more apparent, and the invention itself will be better understood by reference to the following description of the embodiments of the invention, taken in conjunction with the accompanying drawings, wherein.

Figure 1:
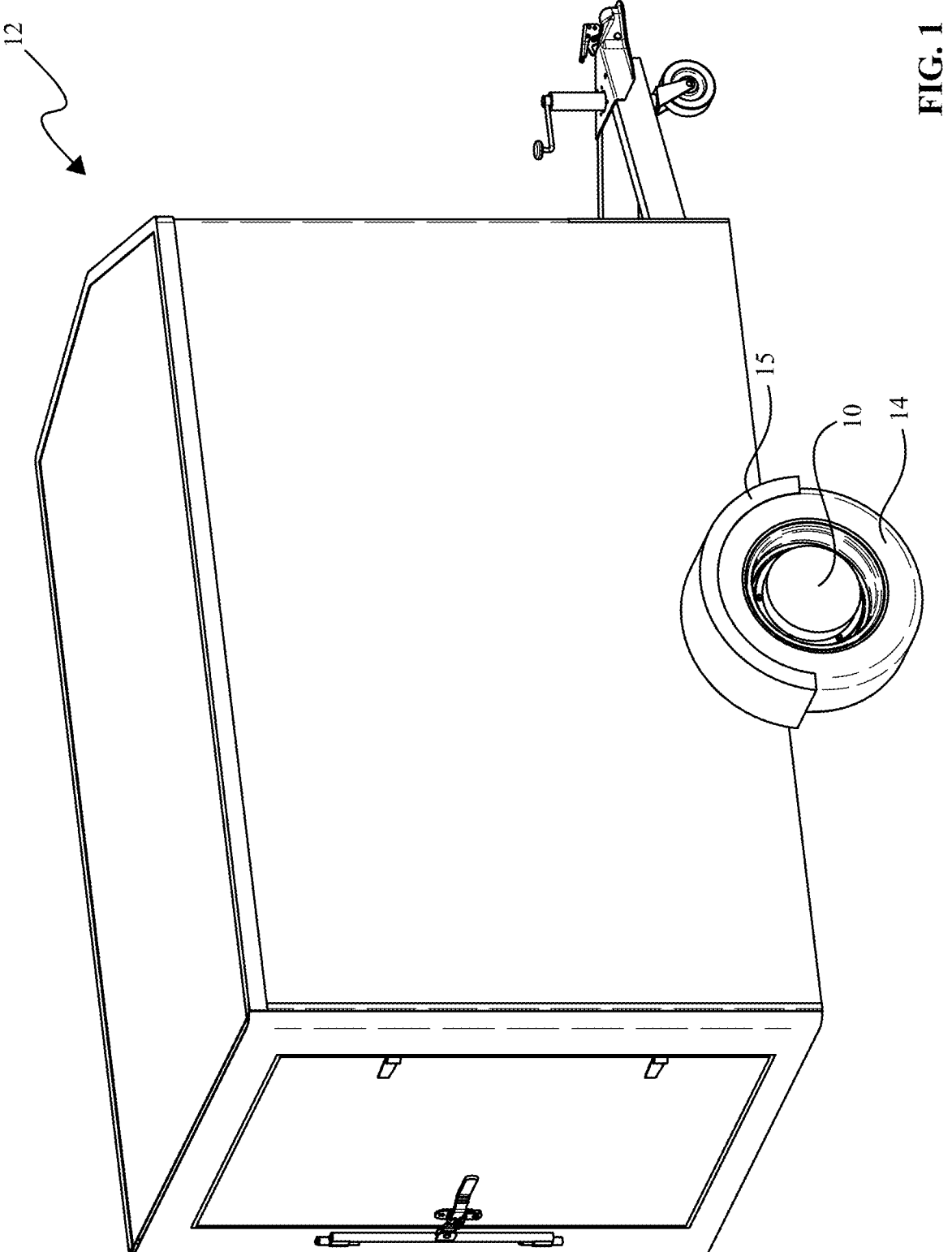
FIG. 1 is a perspective view of a trailer with a generator attached to the wheel thereof.

Corresponding reference characters indicate corresponding parts throughout several views. Although the exemplification set out herein illustrates certain embodiments of the invention, the embodiments disclosed below are not intended to be exhaustive or to be construed as limiting the scope of the invention to the precise form disclosed.

DETAILED DESCRIPTION OF THE PREFERRED EMBODIMENTS

Figure 4:
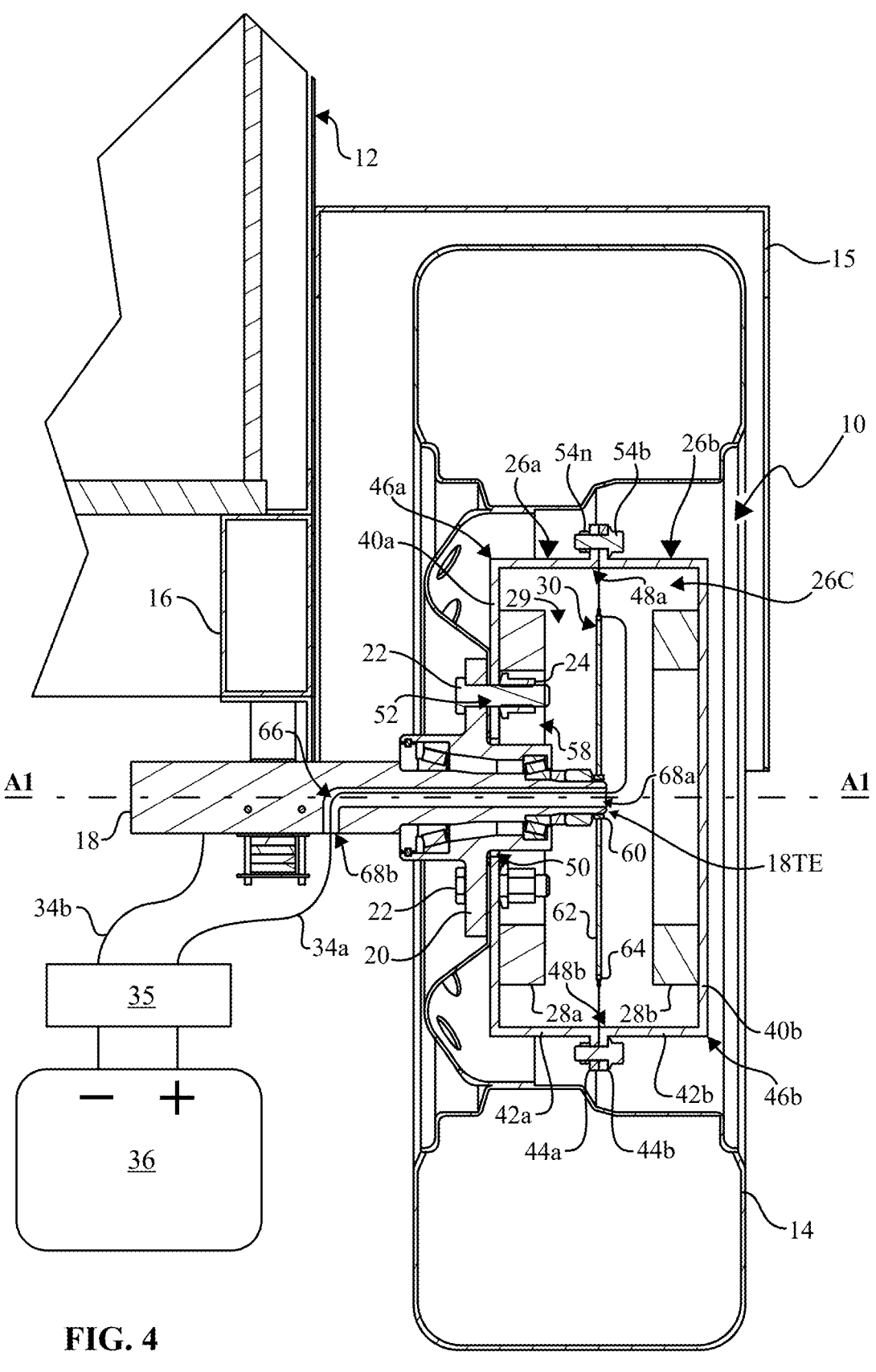
FIG. 4 is a cross-section view of the trailer, wheel, and generator taken along the line 4-4 shown in FIG. 3.

Referring initially to FIGS. 1-4, a generator constructed in accordance with the principles of the present invention is designated by the numeral 10. The generator 10 is adapted to mount to a wheel 14 rotatably mounted on a non-rotating axle 18 of a land vehicle 12, such as, for example, an internal combustion vehicle, an electric vehicle, or a tow-behind vehicle such as a trailer. In use, the generator 10 is configured to convert mechanical energy from the rotation of the wheel 14 into electrical energy which can be used to power an electrical system of the vehicle 12, to power the vehicle 12 itself (in the case of an electric vehicle), or to charge a battery which can be used to power other devices. For example, the generator 10 can be used to power one or more electrical systems or components, such as lights, air conditioners, heaters, etc., of a trailer 12. As best seen in FIG. 4, the trailer 12 includes a non-rotating axle 18 which is mounted to a frame 16, and a hub 20 which is rotatably mounted to the non-rotating axle 18. The wheel 14 is mounted to the hub 20 by a plurality of lug posts 22 and lug nuts 24 and is rotatable together with the hub 20 about an axle longitudinal axis A1. The trailer 12 also includes a fender 15 which is mounted to the side of the trailer 12 and extends over the wheel 14.

Figure 2:
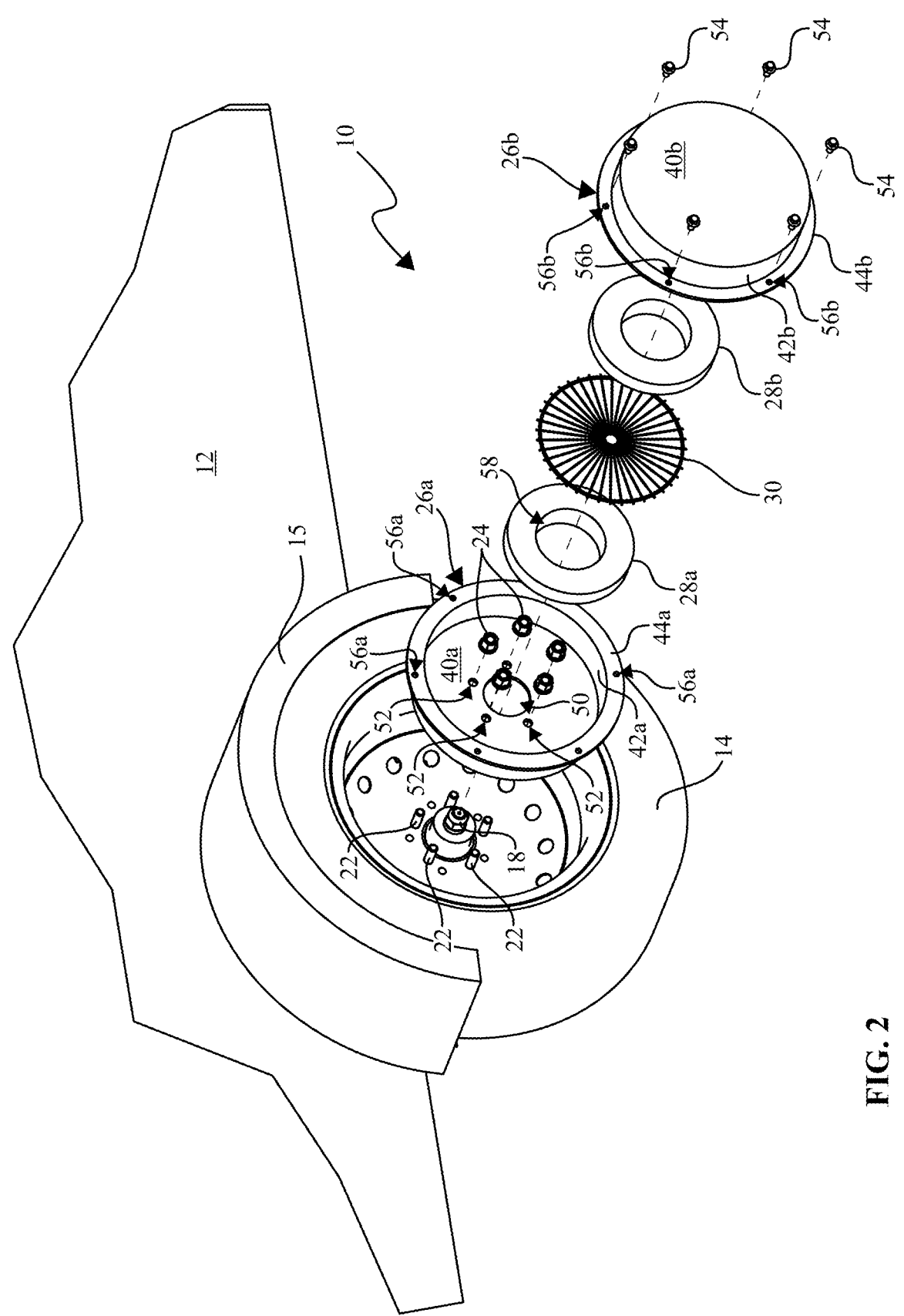
FIG. 2 is an exploded perspective view of the trailer, wheel, and generator wherein the generator is show in an exploded state.
Figure 3:
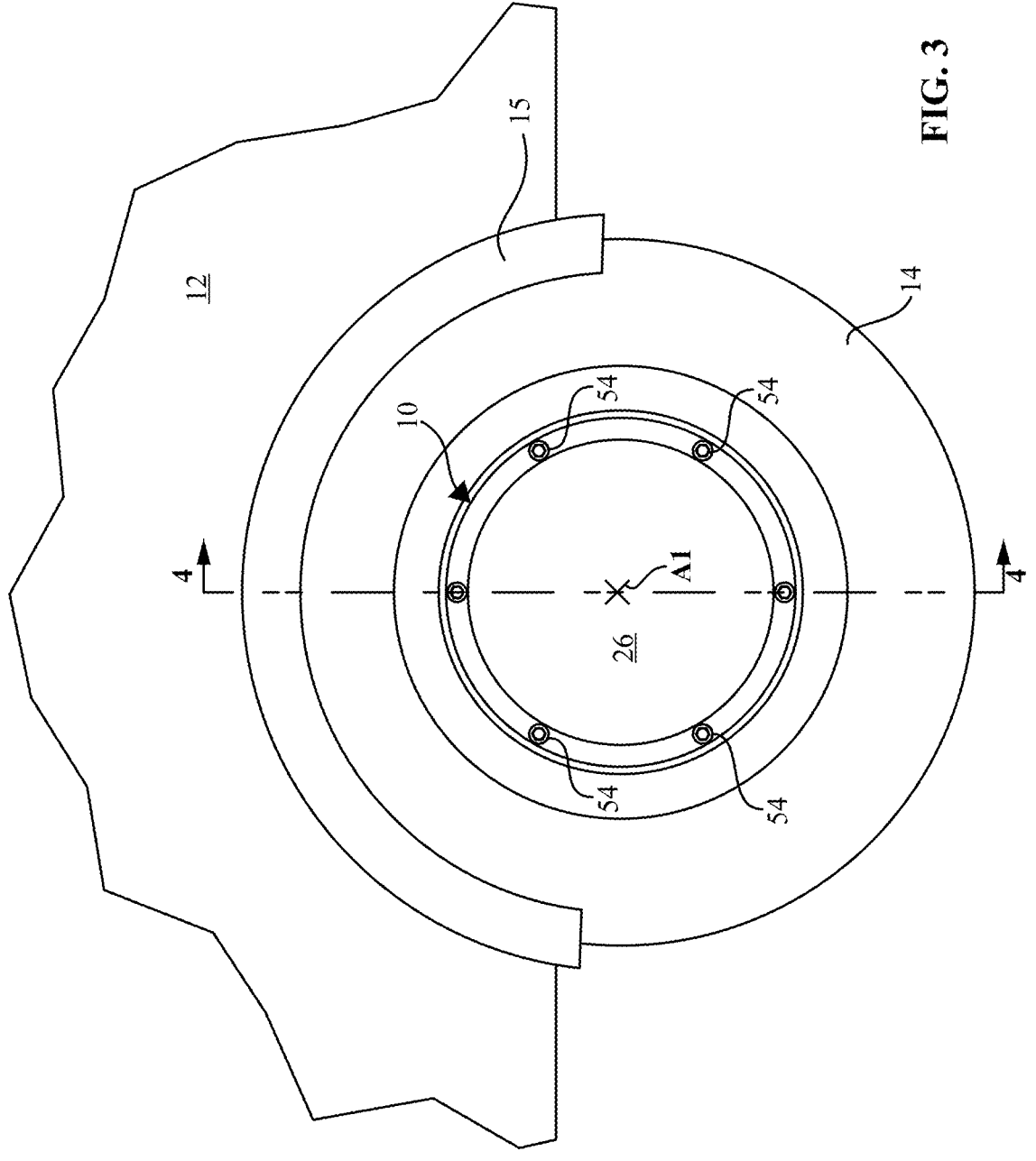
FIG. 3 is a side elevation view of the trailer, wheel, and generator shown in FIG. 1.
Figure 8:
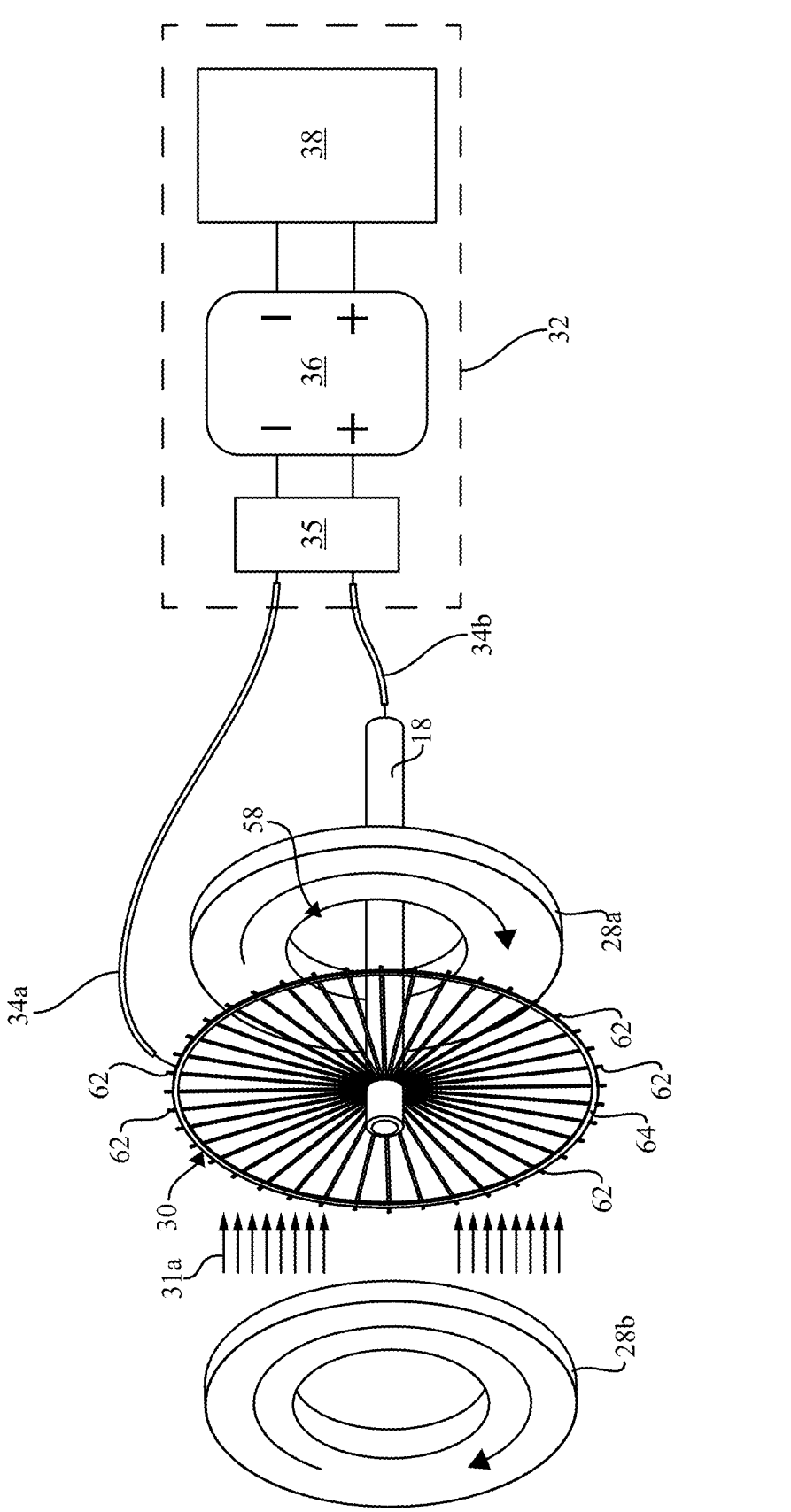
FIG. 8 is perspective view diagrammatically illustrating the magnetic field between the generator magnets and the connection of the generator to an electrical system.

As shown in FIGS. 2 and 4, the generator 10 comprises a cylindrical housing 26, a pair of permanent magnets 28a, 28b, and an inductor wheel 30. The housing 26 is configured to be mounted to the wheel 14 and is rotatable therewith about the axle longitudinal axis A1. The magnets 28a, 28b are mounted to the housing 26 and are spaced apart from each other along the axle longitudinal axis A1. The inductor wheel 30 is mounted to the terminal end 18TE of the non-rotating axle 18 and is supported horizontally between the magnets 28a, 28b. As illustrated in FIG. 8, the inductor wheel 30 and the non-rotating axle 18 are connected to an electrical system 32 by electrical conductors such as, for example, insulated wires 34a, 34b. The electrical system 32 can comprise, for example, a battery 36 and one or more electrical components 38 such as lights, air conditioners, heaters, etc.

Figure 5:
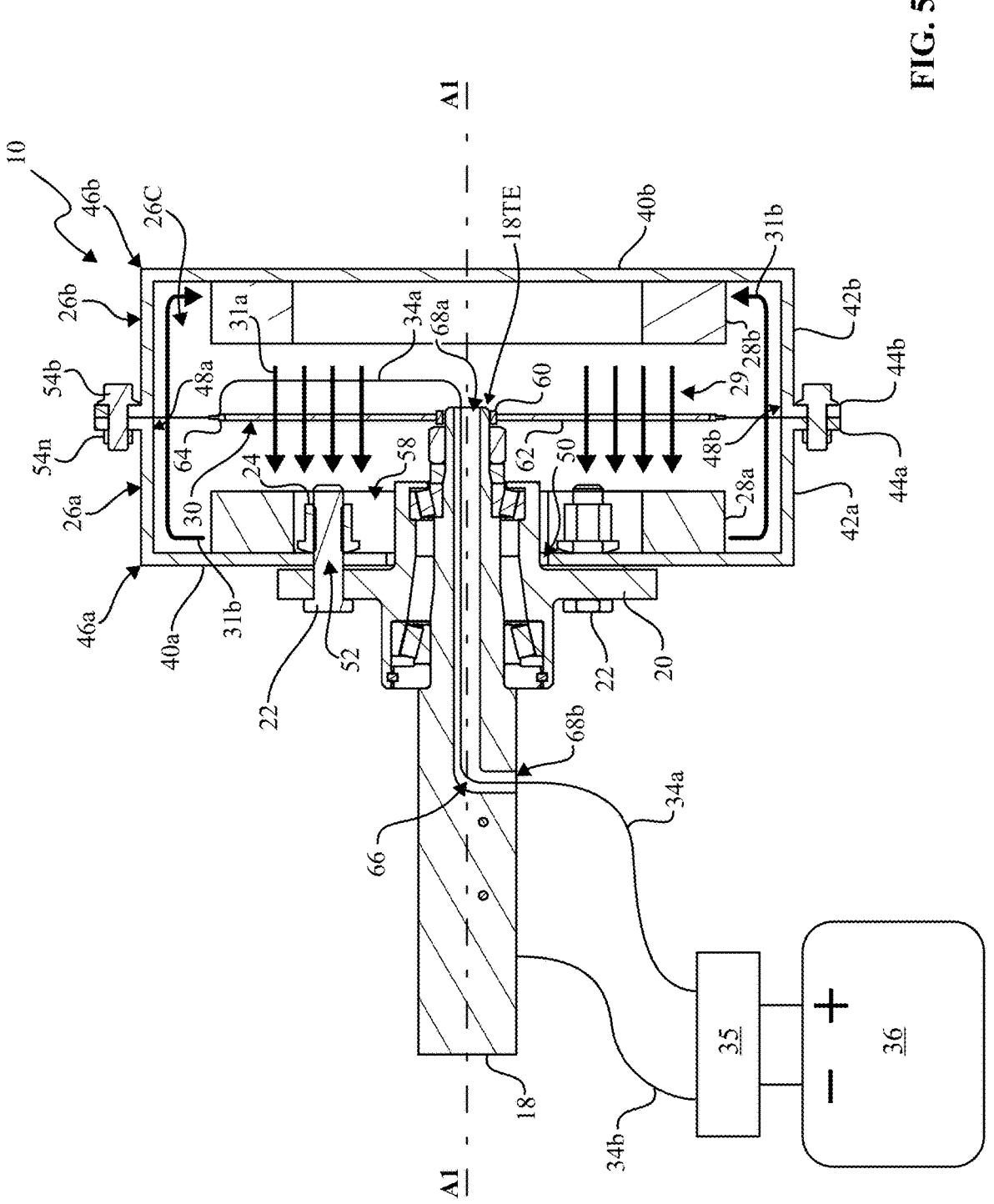
FIG. 5 is another cross-section view of the generator wherein the trailer and the wheel have been removed for greater clarity.
Figure 7:
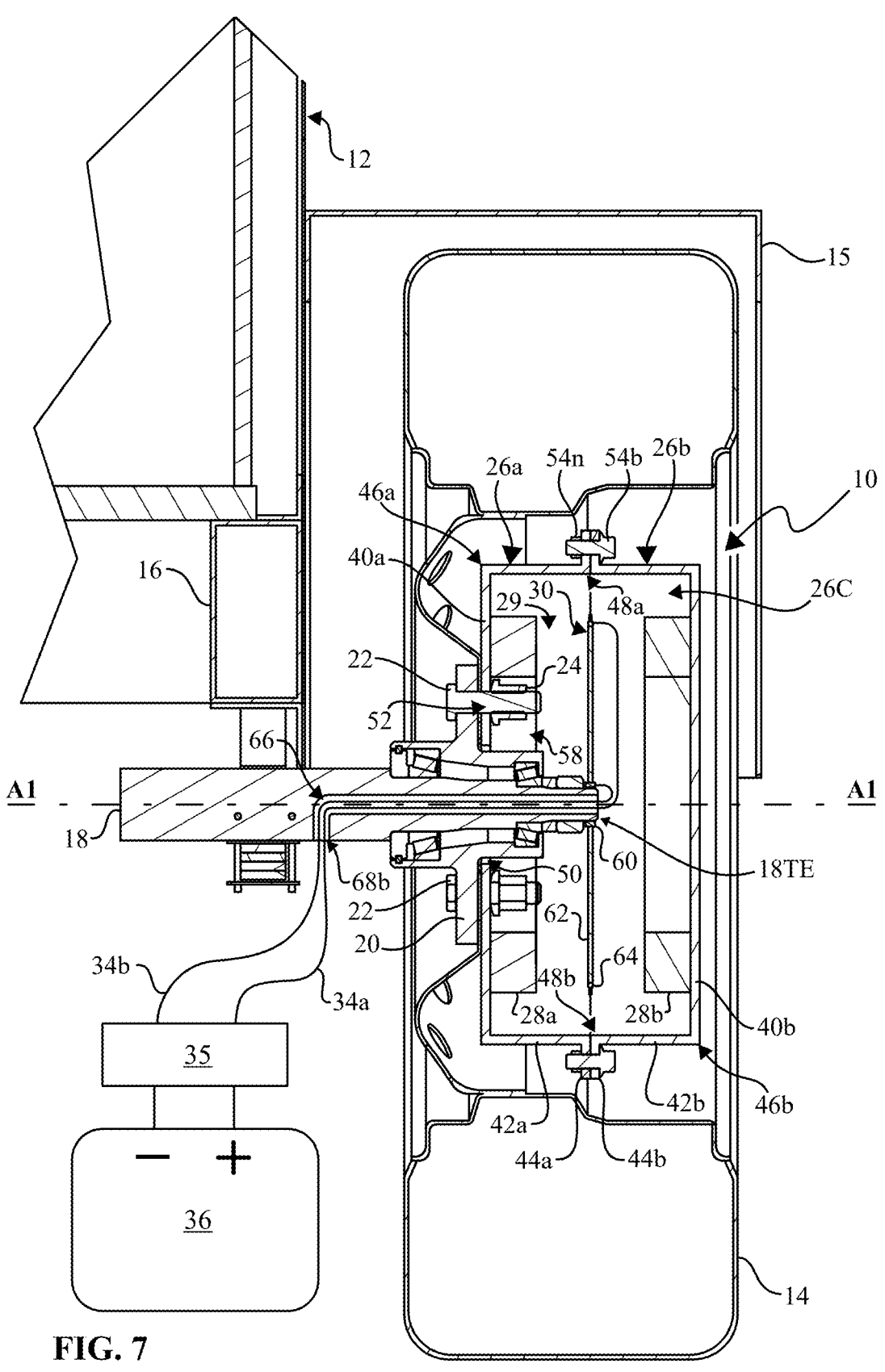
FIG. 7 is a cross-section view of the trailer, wheel, and generator wherein an insulated wire is connected to the annular hub of the inductor wheel.

As best seen in FIGS. 4, 5, and 7, the housing 26 preferably comprises two pan-shaped halves 26a, 26b. The pan-shaped halves 26a, 26b comprise respective planar end walls 40a, 40b, cylindrical perimeter side walls 42a, 42b, and mounting flanges 44a, 44b. The perimeter side walls 42a, 42b extend perpendicularly from the perimeter edges 46a, 46b of the planar end walls 40a, 40b. The mounting flanges 44a, 44b extend radially outwardly from the terminal ends 48a, 48b of the perimeter side walls 42a, 42b. Preferably, the pan-shaped halves 26a, 26b are formed from a rigid, high-strength material such as, for example, steel or other metals comprising iron and/or highly magnetically susceptible materials.

In use, the inboard half 26a is secured to the wheel 14 by the lug posts 22 and lug nuts 24 and is rotatable with the wheel 14 about the axle longitudinal axis A1. Specifically, the end wall 40a of the inboard half 26a also includes a center bore 50 and a plurality of lug bores 52. The center bore 50 is adapted to receive the terminal end 18TE of the non-rotating axle 18 (which extends through the hub 20 (See FIG. 4)) and the lug bores 52 are adapted to receive the lug posts 22. In operation, the inboard half 26a is secured to the wheel 14 by placing the inboard half 26a against the wheel 14 with the lug posts 22 extending through the lug bores 52, threading the lug nuts 24 onto the lug posts 22, and rotatingly tightening lug nuts 24 for thereby clampingly securing the inboard half end wall 40a between the wheel 14 and the lug nuts 24.

The outboard half 26 is secured to the inboard half 26 by a plurality of fasteners 54. The fasteners 54, which can be, for example, nuts 54N and bolts 54B, screws, or rivets (not shown), are configured to engage aligned pairs of fastener bores 56a, 56b which are formed in the mounting flanges 44a, 44b. (See, e.g., FIG. 2). In operation, the outboard half 26b is secured to the inboard half 26a by placing the mounting flange 44b against/abutting the mounting flange 44a with fastener bores 56b aligned with the corresponding fastener bores 56a. The bolts 54B are then inserted through the aligned pairs of fastener bores 56a, 56b and the nuts 54N are threaded onto the bolts 54B for clampingly securing the mounting flanges 44a, 44b, and, hence, the inboard and outboard halves 26a, 26b, together. When the inboard and outboard halves 26a, 26b are secured together, they form a protective barrier around magnets 28a, 28b and the inductor wheel 30 and enclose a housing cavity 26C which is defined between the end walls 40a, 40b and the perimeter side walls 42a, 42b.

As shown in FIGS. 2, 4, 7, and 8, the magnets 28a, 28b can be disc or ring-shaped permanent magnets which are mounted to the housing halves 26a, 26b within the housing cavity 26C. More particularly, the inboard magnet 28a is mounted to the end wall 40a of the inboard half 26a and preferably includes a clearance bore 58. The clearance bore 58 is configured to be aligned colinearly with the axle longitudinal axis A1 and is sized to be received around the lug posts 22 and to loosely receive the lug nuts 24 therethrough such that the lug nuts 24 can be threaded onto the lug posts 22 and rotatingly tightened and clamped against the inboard end wall 40a. The outboard magnet 28b is mounted to the end wall 40b of the outboard half 26b. Preferably, the magnets 28a, 28b are mounted to the end walls 40a, 40b by soldering, welding, sintering, fastening, adhering, etc.

As best seen in FIGS. 4, 5, and 7, the magnets 28a, 28b are spaced apart from each other along the axle longitudinal axis A1 whereby a magnetic field space 29 is defined therebetween. Preferably, the magnets 28a, 28b are mounted with the negative pole of one magnet 28a, 28b facing the positive pole of the other magnet 28a, 28b such that the magnetic flux between the magnets 28a, 28b (illustrated by arrows 31a) flows through the magnetic field space 29 towards one of the magnets 28a, 28b. For example, as illustrated in FIGS. 5 and 8, the outboard magnet 28b can be mounted with its positive pole facing towards the negative pole of the inboard magnet 28a such that the magnetic flux 31a flows towards the inboard magnet 28a parallel to the axle longitudinal axis A1. Additionally, the housing halves 26a, 26b are preferably formed from steel or other materials with high magnetic permeability such that the magnetic flux between the positive pole of the inboard magnet 28a and the negative pole of the outboard magnet 28b (illustrated by arrows 31b) flows between the magnets 28a, 28b through the end walls 40a, 40b, the side walls 42a, 42b, and the mounting flanges 44a, 44b.

Figure 6:
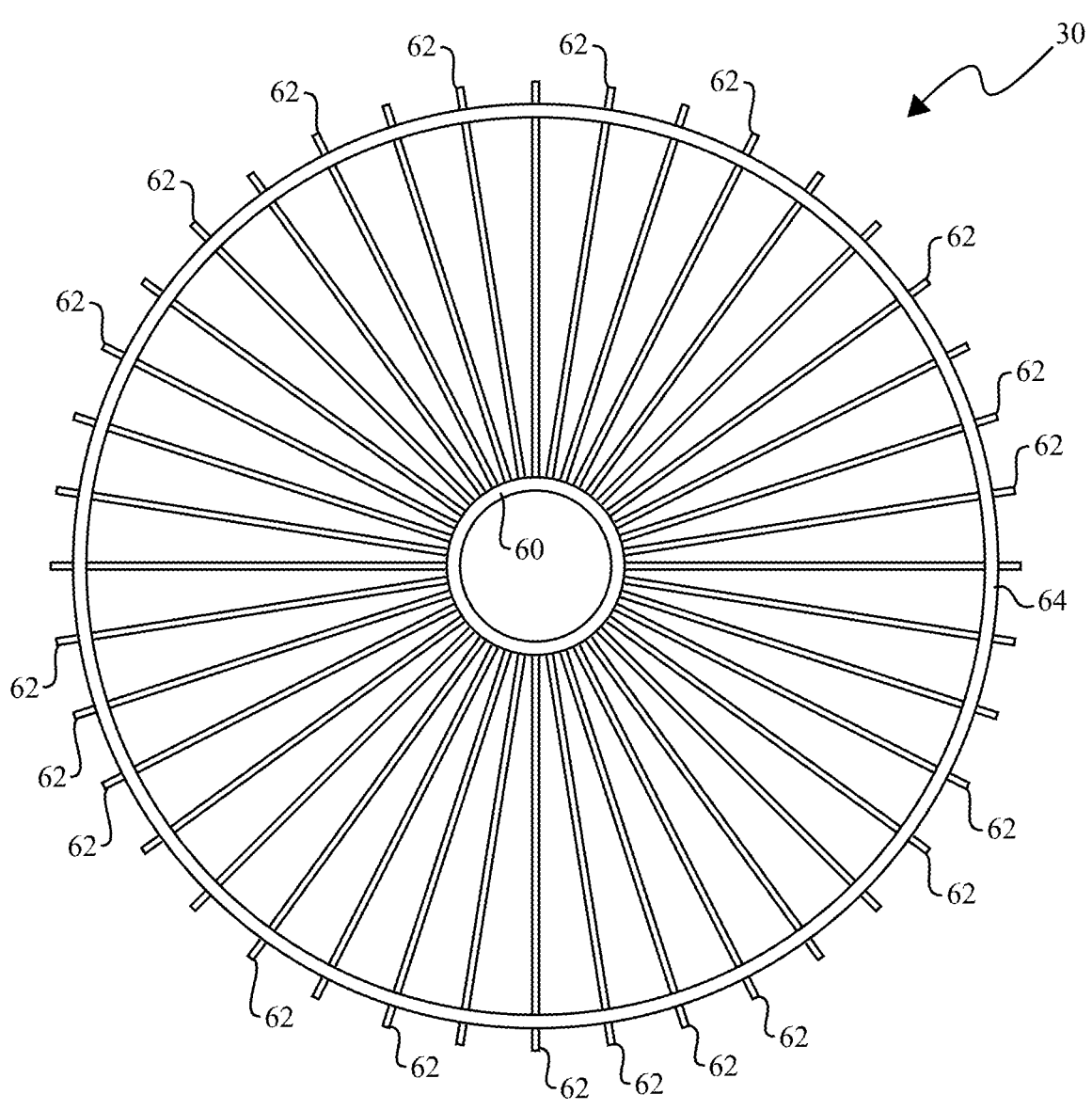
FIG. 6 is a front elevation view of the inductor wheel shown in FIGS. 2, 4, and 5.

As previously mentioned, the inductor wheel 30 is adapted to be mounted to the terminal end 18TE of the non-rotating axle 18 (which extends through the hub 20 and protrudes into the housing cavity 26C) and is supported horizontally between the magnets 28a, 28b. As best seen in FIG. 6, the inductor wheel 30 preferably comprises an annular hub 60, a plurality of wire spokes 62, and a perimeter connecting ring 64. The annular inductor hub 60 is mounted and electrically connected to the axle terminal end 18TE and is secured thereto by, for example, press fitting, soldering, welding, sintering, fastening, adhering, etc. The perimeter connecting ring 64 circumscribes the annular inductor hub 60 and is electrically connected to the electrical system 32 by insulated wire 34a. The wire spokes 62 are electrically connected between the annular inductor hub 60 and the perimeter connecting ring 64. Preferably, the wire spokes 62 extend radially between the annular inductor hub 60 and the perimeter connecting ring 64 and extend perpendicular to the axle longitudinal axis A1 through the magnetic field space 29.

Preferably, the inductor hub 60, the wire spokes 62, and the perimeter connecting ring 64 are formed from electrically conductive materials, such as, for example, copper, aluminum, steel, silver, or gold, and are coupled together such that an electric current can flow between the inductor hub 60 and the perimeter connecting ring 64 through the wire spokes 62. Similarly, the non-rotating axle 18 is preferably formed from a high-strength, electrically conductive material, such as, for example, aluminum or steel. The inductor hub 60 is preferably secured to the non-rotating axle 18 such that an electrical current can flow between the inductor hub 60 and the non-rotating axle 18. For example, the inductor hub 60 can be configured to fit snugly around the axle terminal end 18TE and can be soldered thereto using an electrically conductive solder material. Alternatively, as shown in FIG. 7, the inductor hub 60 can be directly electrically connected to the electrical system 32 by insulated wire 34*b*.

Preferably, insulated wire 34*a* and/or insulated wire 34*b* which connect the inductor wheel 30 to the electrical system 32 are routed behind the wheel 14 and hub 20 through an internal passageway 66 formed in the non-rotating axle 18. More particularly, as best seen in FIGS. 4 and 5, the non-rotating axle 18 preferably includes an internal passageway 66 having a first opening 68*a* adjacent to the axle terminal end 18TE and a second opening 68*b* located on the opposite side of the hub 20 from the axle terminal end 18TE. The internal passageway 66 is configured to receive insulated wire 34*a* and/or insulated wire 34*b* therethrough such that the wires 34*a*, 34*b* can be routed behind the wheel 14 and hub 20 without contacting the wheel 14 and hub 20 or the rotating components of the generator 10.

In operation, the generator 10 is adapted to convert mechanical energy from the rotation of the wheel 14 to electrical energy which can be used to power the electrical system 32. Specifically, the rotation of the wheel 14 caused by, for example, pulling or towing the trailer 12, causes the magnets 28*a*, 28*b*, which are coupled to the wheel 14 by the housing 26, to rotate about the axle longitudinal axis A1. As the magnets 28*a*, 28*b* rotate about the axle longitudinal axis A1, they rotate past the stationary wire spokes 62 and induce an electric current therein. This electrical current flows through a circuit formed by the wire spokes 62, the inductor hub 60, the perimeter connecting ring 64, the non-rotating axle 18, the insulated wires 34*a*, 34*b*, and the electrical system 32 and can be used to charge the battery 36 and/or power the one or more electrical components 38. Hence, the generator 10 converts energy from the rotation of the wheel 14 into electrical energy by using the rotation of the wheel 14 to rotate the magnets 28*a*, 28*b* relative to the wire spokes 62 for inducing an electric current to flow therethrough.

Preferably, the electrical system 32 includes a regulator 35 which is electrically connected between the generator 10 and the battery 36. The regulator 35 is adapted to regulate and maintain the voltage of the electric current used for charging the battery 36. Specifically, as the rotational speed of the wheel 14 increases and decreases, the voltage of the electric current induced in the wire spokes 62 also increases and decreases. The regulator 35 is adapted to receive and regulate the fluctuating electrical current such that the voltage of the current at the output of the regulator 35 remains constant. By regulating the voltage of the electrical current received from the generator 10, the regulator 35 ensures that the voltage of the electric current delivered to the battery 36 remains constant, thereby reducing wear and tear and preventing damage to the battery 36.

While this invention has been described as having an exemplary design, the present invention may be further modified within the spirit and scope of this disclosure. For example, a pair of disk-shaped magnets 28*a*, 28*b* are shown in the figures and described herein above. However, it should be understood the generator 10 can include a plurality of rectangular magnets which are mounted to the housing halves 26*a*, 26*b* in regularly spaced patterns and/or other shapes and configurations of magnets, as may be necessary or desirable Accordingly, this application is intended to cover any variations, uses, or adaptations of the invention using its general principles.

The invention claimed is:

1. A land vehicle wheel mounted electricity generator comprising:
   a non-rotating axle secured to the land vehicle;
   a wheel rotatably mounted to the axle and rotatable about an axle longitudinal axis;
   inboard and outboard magnets secured to the wheel and rotatable therewith about the axle longitudinal axis, said inboard and outboard magnets defining a magnetic field space therebetween; and,
   one or more conductors secured to the non-rotating axle extending in the magnetic field space;
   wherein the one or more conductors are electrically connected between an electrically conductive outer perimeter ring and an electrically conductive inner hub; and,
   wherein as the inboard and outboard magnets rotate about the axle longitudinal axis and past the one or more conductors, electric current is induced in the one or more conductors.

2. The wheel mounted electricity generator of claim 1, wherein the one or more conductors extend at least in part perpendicular to the axle longitudinal axis.

3. The wheel mounted electricity generator of claim 2, wherein the magnetic field space is annular shaped.

4. The wheel mounted electricity generator of claim 1, wherein the one or more conductors extend radially between the outer perimeter ring and the inner hub.

5. The wheel mounted electricity generator of claim 1, wherein the inner hub is electrically connected to the non-rotating axle.

6. The wheel mounted electricity generator of claim 1, wherein an insulated conductor is electrically connected to the perimeter ring and extends through an internal passageway extending into the non-rotating axle.

7. The wheel mounted electricity generator of claim 1 further comprising an inboard housing half which is mounted to the wheel and an outboard housing half which is mounted to the inboard housing half, wherein the inboard magnet is mounted to the inboard housing half and the outboard magnet is mounted to the outboard housing half, and wherein magnetic flux travels between the inboard and outboard magnets through the inboard and outboard housing halves.

8. The wheel mounted electricity generator of claim 7, wherein a hub is rotatably mounted to the axle, wherein the wheel is secured to the hub by a plurality of lug bolts, and wherein the inboard housing half is secured to the wheel by the plurality of lug bolts.

9. The generator of claim 7, wherein the inboard housing half includes a first perimeter flange, wherein the outboard housing half includes a second perimeter flange, and wherein the outboard housing half is secured to the inboard housing half by securing the second perimeter flange to the first perimeter flange.

10. The generator of claim 9, wherein the first and second perimeter flanges are secured together by a plurality of fasteners.

11. The generator of claim 1, wherein the inboard and outboard magnets are ring or disc-shaped permanent magnets.

12. The generator of claim 1, wherein the inboard and outboard magnets each comprises a plurality of magnets.

13. The generator of claim 1, wherein the one or more conductors extend radially from the non-rotating axle.

14. The generator of claim 1, the one or more conductors are electrically connected between an annular outer perimeter ring and an inner hub, and wherein the one or more conductors extend radially relative to the axle longitudinal axis.

15. The generator of claim 1, wherein a battery is electrically connected to the one or more conductors and is charged by the electric current induced in the one or more conductors, and wherein a regulator is electrically connected between the battery and the one or more conductors for regulating the electric current conducted therebetween.

16. A land vehicle wheel mounted electricity generator comprising:

a non-rotating axle secured to the land vehicle;

a wheel rotatably mounted to the axle and rotatable about an axle longitudinal axis;

inboard and outboard magnets secured to the wheel and rotatable therewith about the axle longitudinal axis, said inboard and outboard magnets defining a magnetic field space therebetween; and, one or more electrically conductive spokes secured to and extending radially from the non-rotating axle in the magnetic field space;

wherein the one or more electrically conductive spokes are electrically connected between an electrically conductive outer perimeter ring and an electrically conductive inner hub; and, wherein as the inboard and outboard magnets rotate about the axle longitudinal axis and past the one or more spokes, electric current is induced in the one or more spokes.

17. The wheel mounted electricity generator of claim 16, wherein the inboard and outboard magnets are ring or disc-shaped permanent magnets.

18. The wheel mounted electricity generator of claim 16, wherein the inner hub is electrically connected to the non-rotating axle.

19. The wheel mounted electricity generator of claim 16, wherein an insulated conductor is electrically connected to the perimeter ring and extends through an internal passageway extending into the non-rotating axle.

20. A method of generating electric current using a land vehicle wheel mounted electricity generator comprising:

a non-rotating axle secured to the land vehicle;

a wheel rotatably mounted to the axle and rotatable about an axle longitudinal axis;

inboard and outboard magnets secured to the wheel and rotatable therewith about the axle longitudinal axis, said inboard and outboard magnets defining a magnetic field space therebetween; and, one or more electrically conductive spokes secured to and extending radially from the non-rotating axle in the magnetic field space;

wherein the one or more electrically conductive spokes are electrically connected between an electrically conductive outer perimeter ring and an electrically conductive inner hub;

the method comprising the steps of:

rotating the wheel and the inboard and outboard magnets secured thereto about the axle longitudinal axis;

wherein as the inboard and outboard magnets rotate about the axle longitudinal axis and past the one or more conductors, electric current is induced in the one or more spokes.

* * * * *